(12) United States Patent
Zhang et al.

(10) Patent No.: US 11,834,816 B2
(45) Date of Patent: Dec. 5, 2023

(54) TWO-HANDLE INDUCTIVE FAUCET

(71) Applicant: Xiamen Forbetter Sanitary Ware Co., Ltd., Fujian (CN)

(72) Inventors: Xingui Zhang, Xiamen (CN); Yihui Chen, Xiamen (CN); Qiang Chen, Xiamen (CN); Mouyong Lin, Xiamen (CN)

(*) Notice: Subject to any disclaimer, the term of this patent is extended or adjusted under 35 U.S.C. 154(b) by 722 days.

(21) Appl. No.: 17/010,831

(22) Filed: Sep. 3, 2020

(65) Prior Publication Data
US 2022/0064918 A1 Mar. 3, 2022

(51) Int. Cl.
| | |
|---|---|
| E03C 1/04 | (2006.01) |
| F16K 11/00 | (2006.01) |
| F16K 31/60 | (2006.01) |
| F16K 11/22 | (2006.01) |
| E03C 1/02 | (2006.01) |

(52) U.S. Cl.
CPC ............ *E03C 1/0412* (2013.01); *F16K 11/22* (2013.01); *F16K 19/006* (2013.01); *F16K 31/60* (2013.01); *E03C 1/0403* (2013.01); *E03C 2001/026* (2013.01)

(58) Field of Classification Search
CPC ...... E03C 1/0412; E03C 1/0403; E03C 1/057; E03C 2001/026; F16K 11/22; F16K 19/006; F16K 31/60
See application file for complete search history.

(56) References Cited

U.S. PATENT DOCUMENTS

| | | | | |
|---|---|---|---|---|
| 6,059,192 | A | * | 5/2000 | Zosimadis .............. E03C 1/057 236/12.12 |
| 7,624,757 | B2 | * | 12/2009 | Schmitt ................... F16K 31/05 236/12.12 |
| 8,776,817 | B2 | * | 7/2014 | Sawaski .................. E03C 1/057 137/551 |
| 2003/0088338 | A1 | * | 5/2003 | Phillips ................. F16K 11/207 700/282 |
| 2008/0078019 | A1 | * | 4/2008 | Allen, Jr. ................ E03C 1/057 137/603 |
| 2012/0017367 | A1 | * | 1/2012 | Reeder .................... E03C 1/057 4/597 |
| 2013/0181440 | A1 | * | 7/2013 | Dai ........................ F16K 19/006 285/124.2 |
| 2019/0106865 | A1 | * | 4/2019 | Dolgos ................... F16K 11/20 |

* cited by examiner

*Primary Examiner* — Patrick C Williams

(57) ABSTRACT

A two-handle inductive faucet includes a faucet body, a faucet housing, a faucet base, and a control box. The faucet body is installed to the faucet housing. The faucet body includes two valve core assemblies, a first water outlet pipe, and two first water inlet pipes. The faucet body has two water inlet channels and an upper water outlet channel. The faucet housing is provided with a protruding sensor unit. When the control box receives an opening signal of the sensor unit, the control box controls water from the two water inlet channels to be mixed and then flow out through the first water outlet pipe.

17 Claims, 7 Drawing Sheets

TWO-HANDLE INDUCTIVE FAUCET

BACKGROUND OF THE INVENTION

1. Field of the Invention

The present invention relates to a faucet, and more particularly to a two-handle inductive faucet.

2. Description of the Prior Art

Most of the existing two-handle faucets for 4-inch basins control the flow of water through a mechanical switch. A conventional two-handle faucet has a cold water adjustment handle and a hot water adjustment handle. When in use, the user needs to adjust the flow of cold water through the cold water adjustment handle and the flow of hot water through the hot water adjustment handle for a desired temperature of the mixed cold and hot water. After use, it is necessary to turn off the flow of cold water through the cold water adjustment handle and turn off the flow of hot water through the hot water adjustment handle. When the faucet is used again, it is required to readjust the temperature of the mixed cold and hot water through the cold water adjustment handle and the hot water adjustment handle. It is inconvenient for use.

Accordingly, the inventor of the present invention has devoted himself based on his many years of practical experiences to solve these problems.

SUMMARY OF THE INVENTION

The primary object of the present invention is to provide an easy-to-use two-handle inductive faucet.

In order to achieve the above object, the present invention adopts the following solutions.

A two-handle inductive faucet comprises a faucet body, a faucet housing, a faucet base, and a control box. The faucet base is detachably mounted to a bottom of the faucet housing. The faucet body is installed in the faucet housing. The faucet body includes two valve core assemblies, a first water outlet pipe, and two first water inlet pipes. Each valve core assembly has a water inlet connector and a water outlet connector. The water inlet connectors of the two valve core assemblies are hermetically connected to the first water inlet pipes, respectively. The faucet body has two water inlet channels and an upper water outlet channel. The water outlet connectors of the two valve core assemblies are hermetically connected to the water inlet channels, respectively. The upper water outlet channel is hermetically connected to the first water outlet pipe. The faucet housing is provided with a protruding sensor unit. The sensor unit is in signal communication with the control box. When the control box receives an opening signal of the sensor unit, the control box controls water from the two water inlet channels to be mixed and then flow out through the first water outlet pipe.

Preferably, the faucet body further includes a five-way connector, a second water outlet pipe, and a second water inlet pipe. The two water inlet channels and the water outer channel are defined in the five-way connector. The five-way connector further has an entry channel and a lower water outlet channel. The entry channel communicates with the two water inlet channels. The lower water outlet channel communicates with the upper water outlet channel. The entry channel is hermetically connected to the second water inlet pipe. The lower water outlet channel is hermetically connected to the second water outlet pipe. The second water inlet pipe and the second water outlet pipe are hermetically connected to the control box. When the control box receives the opening signal of the sensor unit, the control box controls the second water inlet pipe to communicate with the second water outlet pipe.

Preferably, the control box includes a solenoid valve therein, and the solenoid valve controls the second water inlet pipe to communicate with the second water outlet pipe.

Preferably, each valve core assembly includes a valve core, a valve core seat, and a valve core locking nut. The valve core is accommodated in the valve core seat. The valve core has an adjustment shaft for adjusting the amount of water. The adjustment shaft of the valve core extends out of the valve core locking nut. The valve core locking nut is configured to lock the valve core in the valve core seat. The valve core is hermetically connected to the valve core seat. The water inlet connector and the water outlet connector are arranged on the valve core seat.

Preferably, the faucet housing has two handles. The adjustment shafts of the valve cores of the two valve core assemblies are connected to the handles, respectively.

Preferably, the sensor unit is arranged on the faucet housing directly below the first water outlet pipe.

Preferably, the water outlet connector and a corresponding one of the water inlet channels of the five-way connector are connected through a locking block to be mated with a locking portion. The locking block is detachably, rotatably locked in the locking portion.

Preferably, the locking portion includes a horizontal perforation and a vertical perforation communicating with the horizontal perforation.

Preferably, the locking block is arranged on an outer side wall of the water outlet connector. An inner wall surface of each water inlet channel of the five-way connector is recessed with a slide groove. A wall of each water inlet channel of the five-way connector is formed with the horizontal perforation and the vertical perforation. The locking block is slid into the horizontal perforation from the slide groove and locked in the vertical perforation.

Alternatively, the locking block is arranged on an outer side wall of each water inlet channel of the five-way connector. An inner wall surface of the water outlet connector is recessed with a slide groove. A wall of the water outlet connector is formed with the horizontal perforation and the vertical perforation. The locking block is slid into the horizontal perforation from the slide groove and locked in the vertical perforation.

Preferably, the sensor unit includes a window and a casing. The window is disposed on the casing. The window protrudes out of the faucet housing. A circuit control board and a sensor are provided in the casing. The sensor is located corresponding to the window. The sensor is electrically connected to the circuit control board. The circuit control board is electrically connected to the control box.

Preferably, a retaining buckle is fixedly connected to a back of the casing. The retaining buckle has two pawls. The pawls are configured to clamp two sides of the first water outlet pipe. Distal ends of the pawls are pressed against an inner wall of the faucet housing.

Preferably, the inner wall of the faucet housing is provided with a counterbore, and the distal ends of the pawls are pressed against a step of the counterbore.

Preferably, the retaining buckle includes a retaining surface and two spaced support members. The pawls are disposed on the retaining surface. The retaining surface is located above the upper water outlet channel of the five-way connector. The casing is pressed against the inner wall of the faucet housing by the support members.

Preferably, the first water outlet pipe includes a pipe casing and an inner pipe. The inner pipe is accommodated in the pipe casing. The faucet housing has a spout connector. A sleeve is sleeved onto the spout connector. The pipe casing is rotatably, hermetically connected to the sleeve. An inner end of the inner pipe is provided with a connector member. The inner end of the inner pipe is accommodated in the faucet housing. A side wall of the connector member is formed with an engaging groove. The pawls of the retaining buckle are engaged in the engaging groove. The connector member is rotatably, hermetically connected to the upper water outlet channel of the five-way connector. A limiting rib is provided in the upper water outlet channel of the five-way connector. The inner pipe is arranged above the limiting rib.

Preferably, a bottom of the faucet base is integrally formed with two threaded pipes. The first water inlet pipes are inserted through the threaded pipes, respectively. The second water outlet pipe and the second water inlet pipe are inserted through the faucet base and fixed to the five-way connector.

Preferably, a top of the faucet base is integrally formed with two split threaded connectors. The threaded connectors communicate with the corresponding threaded pipes, respectively. The first water inlet pipes are inserted into the corresponding threaded connectors, respectively. The water inlet connectors of the two valve core assemblies are accommodated in the corresponding threaded connectors, respectively.

Preferably, the sensor unit is provided with an upper connecting wire having a wire connector. The control box is provided with a lower connecting wire having another wire connector. The wire connector of the upper connecting wire is electrically connected to the wire connector of the lower connecting wire.

After adopting the above technical solutions, through the structural design of the faucet body of the present invention, cold water and hot water flow through the two first water inlet pipes respectively to be mixed in the five-way connector to form mixed water with a suitable temperature after adjustment. When an object to be sensed (such as a user's hand) is aligned with the position of the sensor unit, the sensor unit will issue an opening signal. After the control box receives the opening signal of the sensor unit, the control box controls the mixed water to flow out through the first water outlet pipe. When the object to be sensed is aligned with the position of the sensor unit again, the previously adjusted mixed water with a suitable temperature can still flow out through the first water outlet pipe. There is no need to adjust the temperature of the mixed water each time, which is convenient for use.

DETAILED DESCRIPTION OF THE PREFERRED EMBODIMENTS

Figure 1:
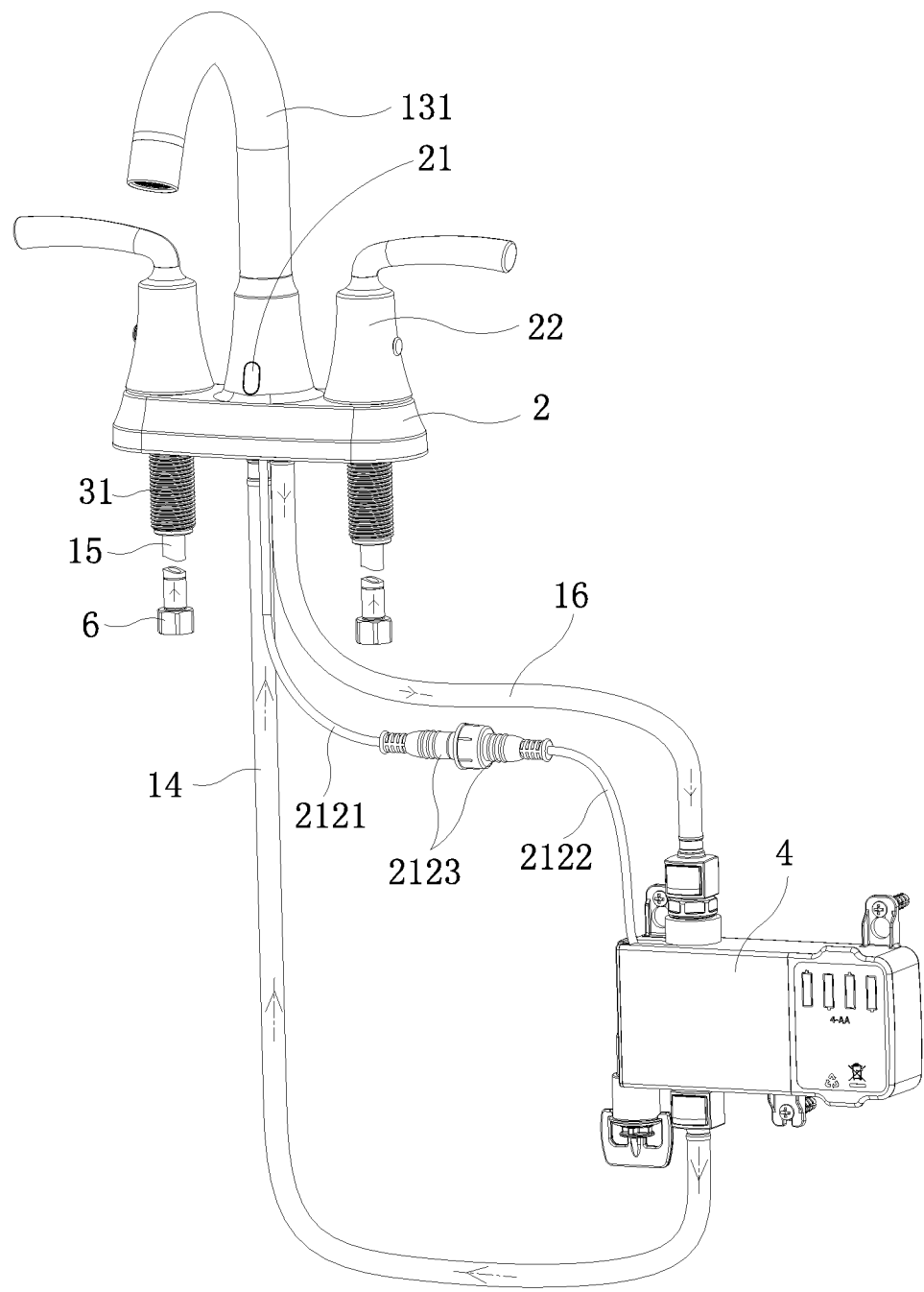
FIG. 1 is a schematic view of a first embodiment of the present invention, wherein the arrow direction in the figure indicates the flow direction of water.

In order to achieve the above-mentioned objectives and effects, the technical means and structure adopted by the present invention are described in detail below to illustrate the features and functions of the preferred embodiments of the present invention for a complete understanding of the present invention.

Referring to FIG. 1 through FIG. 9, the present invention discloses a two-handle inductive faucet, comprising a faucet body 1, a faucet housing 2, a faucet base 3, and a control box 4. The faucet base 3 is detachably mounted to the bottom of the faucet housing 2. The faucet body 1 is installed in the faucet housing 2. The faucet body 1 includes two valve core assemblies 11, a first water outlet pipe 13, and two first water inlet pipes 15. Each valve core assembly 11 has a water inlet connector 111 and a water outlet connector 112. The water inlet connectors 111 of the two valve core assemblies 11 are hermetically connected to the first water inlet pipes 15, respectively. The faucet body 1 has two water inlet channels 121 and an upper water outlet channel 123. The water outlet connectors 112 of the two valve core assemblies 11 are hermetically connected to the water inlet channels 121, respectively. The upper water outlet channel 123 is hermetically connected to the first water outlet pipe 13. The faucet housing 2 is provided with a protruding sensor unit 21. The sensor unit 21 is in signal communication with the control box 4. When the control box 4 receives an opening signal of the sensor unit 21, the control box 4 controls water from the two water inlet channels 121 to be mixed and then flow out through the first water outlet pipe 13.

The faucet body 1 further includes a five-way connector 12, a second water outlet pipe 14, and a second water inlet pipe 16. The five-way connector 12 has the two water inlet channels 121, an entry channel 122, the upper water outlet channel 123, and a lower water outlet channel 124. The entry channel 122 communicates with the two water inlet channels 121. The lower water outlet channel 124 communicates with the upper water outlet channel 123. The entry channel 122 is hermetically connected to the second water inlet pipe 16. The lower water outlet channel 124 is hermetically connected to the second water outlet pipe 14. The second water inlet pipe 16 and the second water outlet pipe 14 are hermetically connected to the control box 4. When the control box 4 receives the opening signal of the sensor unit 21, the control box 4 controls the second water inlet pipe 16 to communicate with the second water outlet pipe 14. The communication may be in a wired manner or in a wireless manner. The control box 4 is arranged under the faucet base 3.

Therefore, the faucet provided by the present invention allows appropriate amounts of cold water and hot water to flow through the two first water inlet pipes 15 respectively to be mixed in the five-way connector 12 to form mixed water with a suitable temperature after adjustment, and then the mixed water flows from the entry channel 122 to the second water inlet pipe 16. When an object to be sensed (such as a user's hand) is aligned with the position of the sensor unit 21, the sensor unit 21 will issue an opening signal. After the control box 4 receives the opening signal of the sensor unit 21, the second water inlet pipe 16 is in fluid communication with the second water outlet pipe 14, so that the mixed water flows from the second water inlet pipe 16 to the second water outlet pipe 14, and then flows through the lower water outlet channel 124 and the upper water outlet channel 123, and finally flows out through the first water outlet pipe 13. Conversely, when the object to be sensed is far away from the position of the sensor unit 21, the control box 4 will disconnect the second water inlet pipe 16 and the second water outlet pipe 14. When the object to be sensed is aligned with the position of the sensor unit 21 again, the previously adjusted mixed water with a suitable temperature can still flow out from the first water outlet pipe 13. There is no need to adjust the temperature of the mixed water each time, which is convenient for use.

Figure 2:
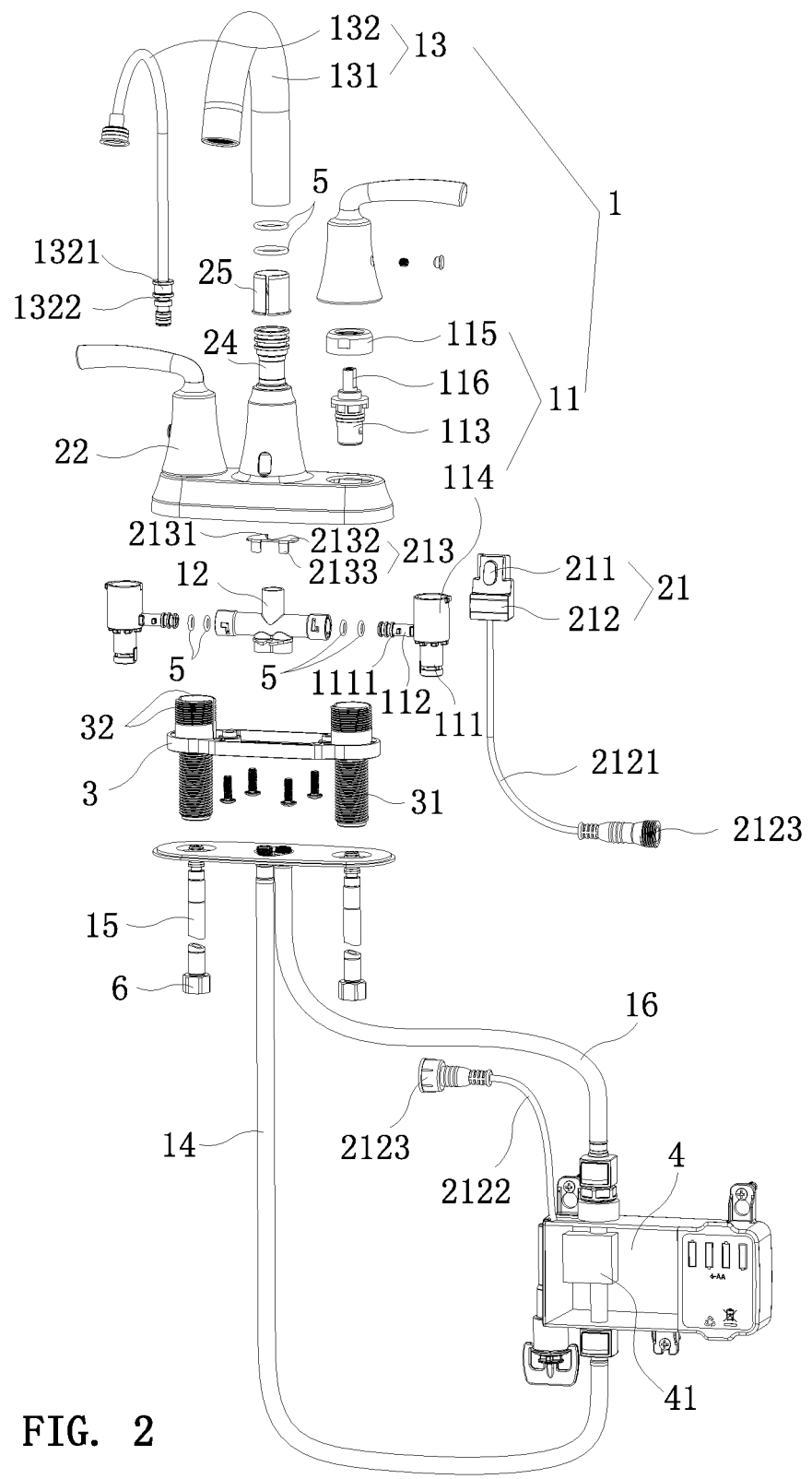
FIG. 2 is an exploded view of the first embodiment of the present invention.

As shown in FIG. 2, a solenoid valve 41 is provided in the control box 4 for controlling the water to flow out from the first water outlet pipe 13. The solenoid valve 41 controls the second water inlet pipe 16 to communicate with the second water outlet pipe 14.

The valve core assembly 11 may include a valve core 113, a valve core seat 114, and a valve core locking nut 115. The valve core 113 is accommodated in the valve core seat 114. The valve core 113 has an adjustment shaft 116 for adjusting the amount of water. The adjustment shaft 116 of the valve core 113 extends out of the valve core locking nut 115. The valve core locking nut 115 is configured to lock the valve core 113 in the valve core seat 114. The valve core 113 is hermetically connected to the valve core seat 114. Both the water inlet connector 111 and the water outlet connector 112 are arranged on the valve core seat 114, so that the first water inlet pipe 15 is hermetically connected to the water inlet connector 111 of the valve core seat 114 to allow water to flow in the valve core seat 114 alone.

In order to facilitate the adjustment of the water temperature, the faucet housing 2 has two handles 22. The adjustment shafts 116 of the valve cores 113 of the two valve core assemblies 2 are connected to the handles 22, respectively.

Further, the sensor unit 21 may be arranged on the faucet housing 2 directly below the first water outlet pipe 13. In this way, when an object to be sensed (such as a user's hand) is aligned with the position of the sensor unit 21, the water flows out through the first water outlet pipe 13 to clean the object to be sensed (such as a user's hand) in time.

Figure 3:
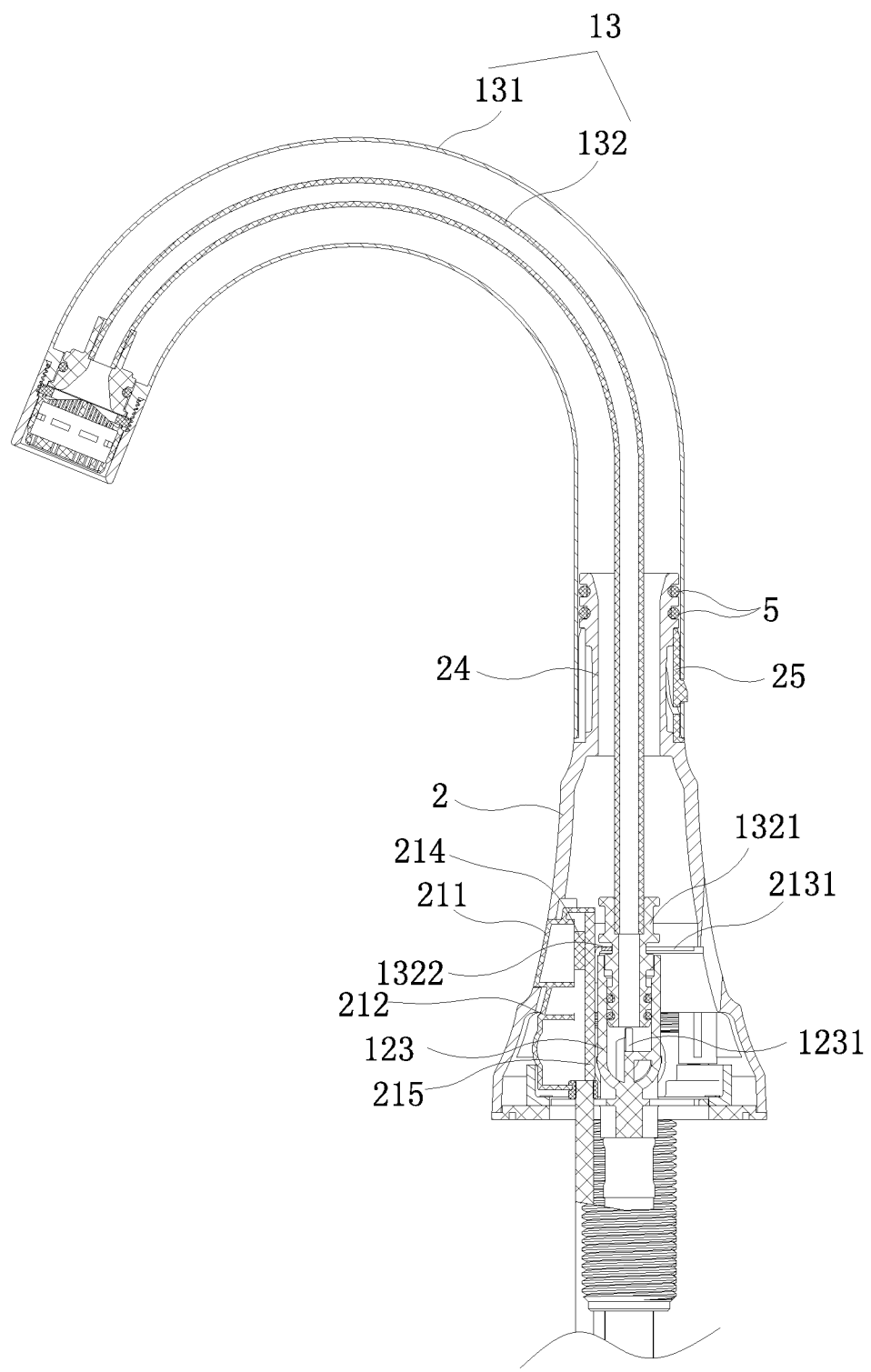
FIG. 3 is a partial cross-sectional view of the first embodiment of the present invention.
Figure 4:
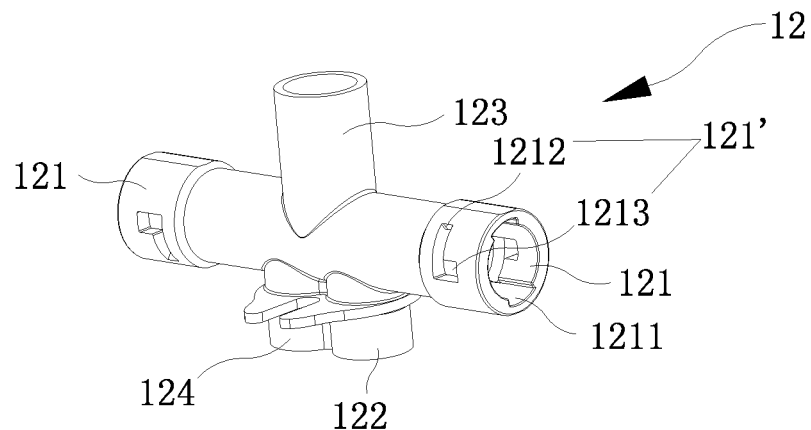
FIG. 4 is a perspective view of the five-way connector of the first embodiment of the present invention.
Figure 5:
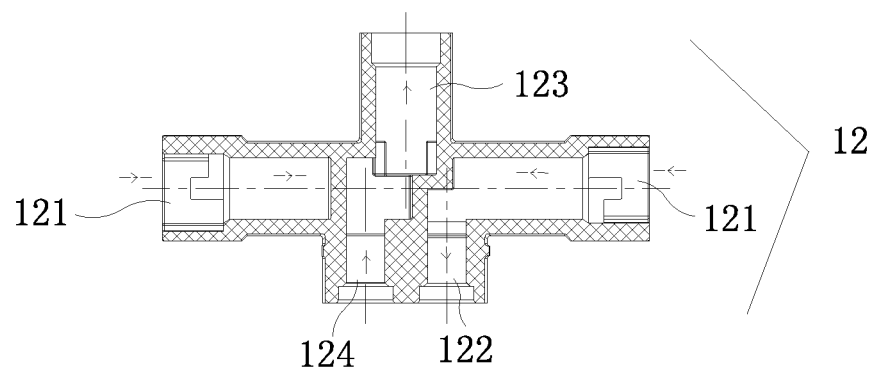
FIG. 5 is a cross-sectional view of FIG. 4, wherein the arrow direction in the figure indicates the flow direction of water.
Figure 6:
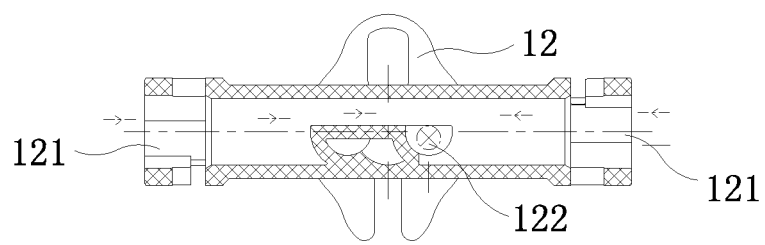
FIG. 6 is a partial cross-sectional view of FIG. 4, wherein the arrow direction in the figure indicates the flow direction of water.

The sensor unit 21 includes a window 211 and a casing 212. The window 211 is disposed on the casing 212. The window 211 protrudes out of the faucet housing 2. A circuit control board 215 and a sensor 214 are provided in the casing 212. As shown in FIG. 3, the sensor 214 is located corresponding to the window 211. The sensor 214 is electrically connected to the circuit control board 215. The circuit control board 215 is electrically connected to the control box 4. The window 211 may be light-pervious. The casing 212 is engaged with the inner wall of the faucet housing 2. When the sensor 214 in the window 211 senses the presence of the object to be sensed, the circuit control board 215 in the casing 212 will issue an opening signal to the solenoid valve 41 to control the second water inlet pipe 16 to communicate with the second water outlet pipe 14, so that the water flows out from the first water outlet pipe 13.

Further, a retaining buckle 213 is fixedly connected to the back of the casing 212. The retaining buckle 213 has two pawls 2131. The pawls 2131 are configured to clamp two sides of the first water outlet pipe 13. The distal ends of the pawls 2131 are pressed against the inner wall of the faucet housing 2. Through the retaining buckle 213, the casing 212 can be firmly held against the inner wall of the faucet housing 2 to prevent the sensor unit 21 from falling off.

Figure 7:
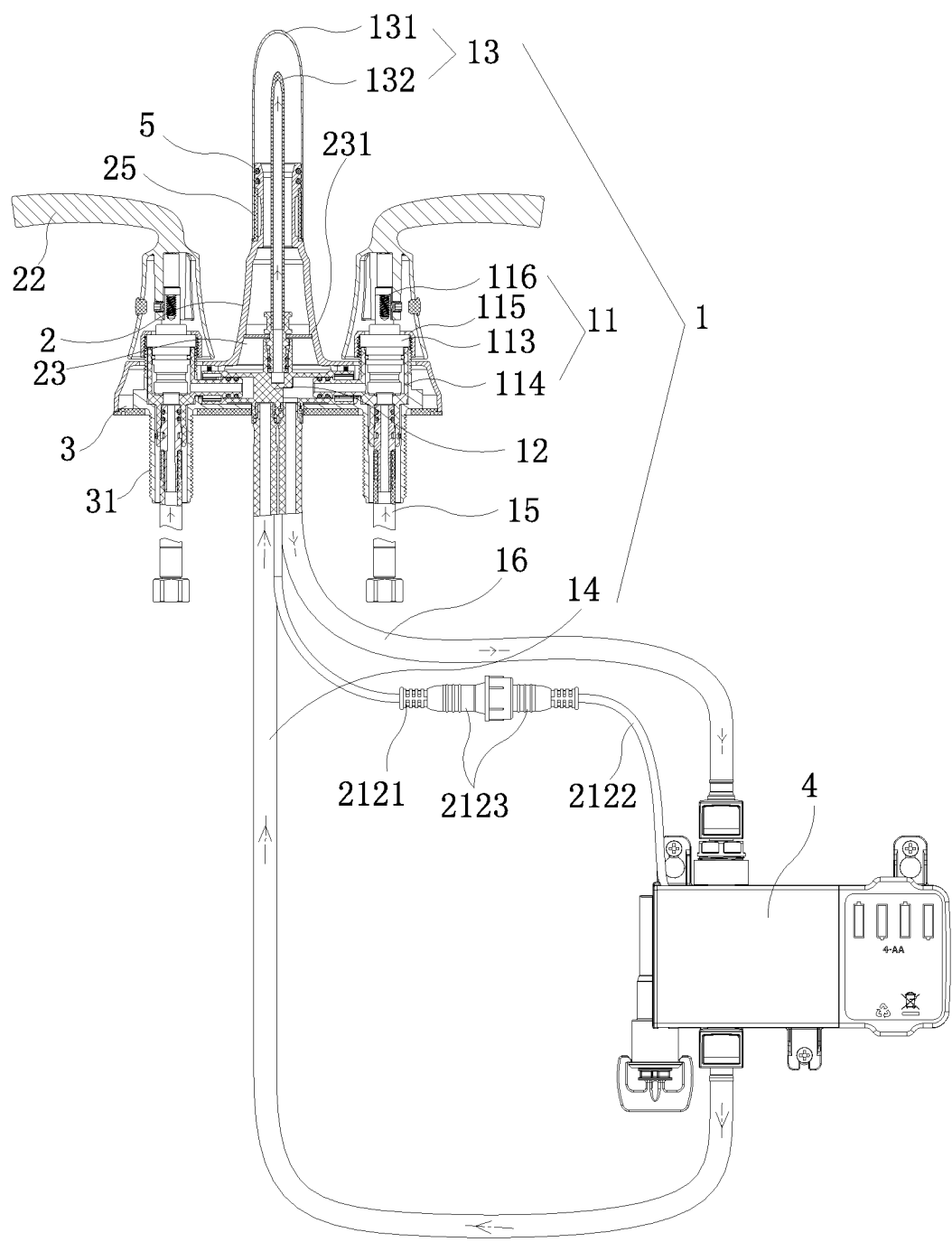
FIG. 7 is a partial cross-sectional view of the first embodiment of the present invention, wherein the arrow direction in the figure indicates the flow direction of water.
Figure 8:
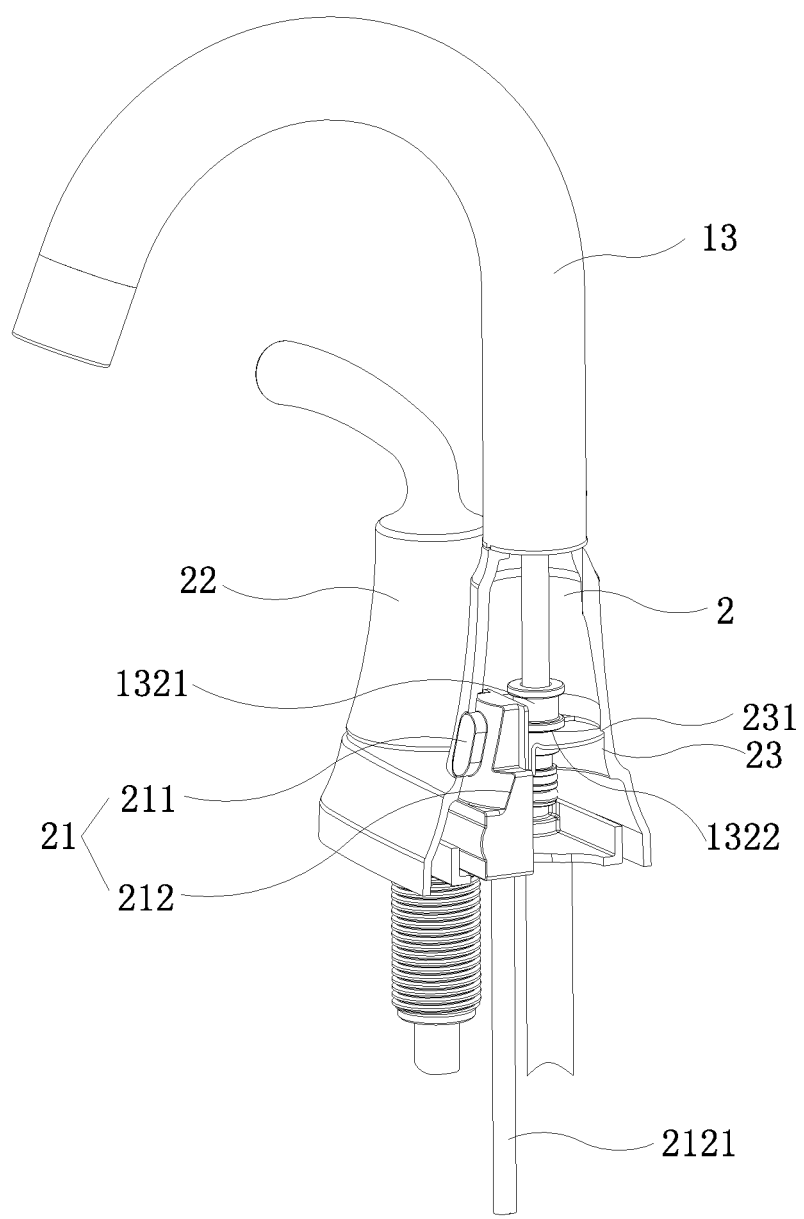
FIG. 8 is a partial schematic view of the first embodiment of the present invention.

Furthermore, as shown in FIG. 3, FIG. 7 and FIG. 8, the inner wall of the faucet housing 2 may be provided with a counterbore 23. The distal ends of the pawls 2131 are pressed against a step 231 of the counterbore 23. Therefore, the step 231 of the counterbore 23 restricts the upward movement of the pawls 2131 to prevent the flow of water from impacting and deforming the pawls 2131.

The retaining buckle 213 may include a retaining surface 2132 and two spaced support members 2133. The pawls 2131 are disposed on the retaining surface 2132. The retaining surface 2132 is located above the upper water outlet channel 123 of the five-way connector 12. The casing 212 is pressed against the inner wall of the faucet housing 2 by the support members 2133 for the window 211 to extend out of the faucet housing 2, so that the upper water outlet channel 123 of the five-way connector 12 supports the retaining surface 2132 to ensure that the sensor unit 21 will not fall off.

Further, the first water outlet pipe 13 may include a pipe casing 131 and an inner pipe 132. The inner pipe 132 is accommodated in the pipe casing 131. The faucet housing 2 has a spout connector 24. A sleeve 25 is sleeved onto the spout connector 24. The pipe casing 131 is rotatably, hermetically connected to the sleeve 25. An inner end of the inner pipe 132 is provided with a connector member 1321. The inner end of the inner pipe 132 is accommodated in the faucet housing 2. The side wall of the connector member 1321 is formed with an engaging groove 1322. The pawls 2131 of the retaining buckle 213 is engaged in the engaging groove 1322. The connector member 1321 is rotatably, hermetically connected to the upper water outlet channel 123 of the five-way connector 12. The upper water outlet channel 123 of the five-way connector 12 is provided with a limiting rib 1231. The inner pipe 132 is arranged above the limiting rib 1231 to ensure that the pipe casing 131 and the inner pipe 132 can rotate 360 degrees horizontally together.

Further, the bottom of the faucet base 3 may be integrally formed with two threaded pipes 31. The first water inlet pipes 15 are inserted through the threaded pipes 31, respectively. The second water outlet pipe 14 and the second water inlet pipe 16 are inserted through the faucet base 3 and fixed to the five-way connector 12. The threaded pipes 31 may be made of a metal or plastic material, so that the user can choose a desired one according to his/her needs.

Furthermore, the top of the faucet base 3 may be integrally formed with two split threaded connectors 32. The split threaded connector 32 is formed with an axial opening, giving way to the water outlet connector 112, that is, the water outlet connector 112 extends out from the opening. The threaded connectors 32 communicate with the corresponding threaded pipes 31, respectively. The first water inlet pipes 15 are inserted into the corresponding threaded connectors 32, respectively. The water inlet connector 111 is accommodated in the corresponding threaded connector 32. As the threaded connector 32 is screwed into the faucet housing 2, the threaded connector 32 can be tightly fitted with the faucet housing 2.

In addition, the middle of the bottom plate of the faucet base 3 is provided with a through hole for the passing of the upper water outlet channel 123 and the lower water outlet channel 124.

Further, the sensor unit 21 may be provided with an upper connecting wire 2121 having a wire connector 2123. The upper connecting wire 2121 is electrically connected to the circuit control board 215. The control box 4 is provided with a lower connecting wire 2122 with another wire connector 2123. The wire connector 2123 of the upper connecting wire 2121 is electrically connected to the wire connector 2123 of the lower connecting wire 2122. The electrical connection may be a mutual plug-in contact connection, but is not limited to this. This facilitates the disassembly and assembly the faucet of the present invention.

In this embodiment, the above-mentioned sealing connection is realized by providing a sealing ring 5, which will not be described herein.

In order to facilitate the connection and use of the faucet provided by the present invention, the bottom of the first water inlet pipe 15 may be provided with a screw joint 6.

Further, the water outlet connector 112 and the water inlet channel 121 of the five-way connector 12 are connected through a locking block 1111 to be mated with a locking portion 121'. The locking block 1111 is detachably, rotatably locked in the locking portion 121'.

In this embodiment, the locking portion 121' includes a horizontal perforation 1212 and a vertical perforation 1213 communicating with the horizontal perforation 1212, but not limited thereto.

In the first embodiment, as shown in FIG. 2 and FIG. 4 to FIG. 6, the outer side wall of the water outlet connector 112 is provided with at least one locking block 1111. The number of the locking blocks 1111 is two for description. The inner wall surface of each water inlet channel 121 of the five-way connector 12 is recessed with a slide groove 1211. The wall of each water inlet channel 121 of the five-way connector 12 is formed with a horizontal perforation 1212 and a vertical perforation 1213 communicating with the horizontal perforation 1212. The locking block 1111 is slid into the horizontal perforation 1212 from the slide groove 1211 and then locked in the vertical perforation 1213, so that the water outlet connector 112 and the water inlet channel 121 of the five-way connector 12 can be quickly disassembled and firmly assembled.

When in installation, the valve core assembly 11 is first aligned with the water inlet channel 121 of the five-way connector 12, and the locking block 1111 is slid along the slide groove 1211 into the water inlet channel 121 of the five-way connector 12. Then, the locking block 1111 enters the horizontal perforation 1212 from the slide groove 1211, and the valve core assembly 11 is rotated for the locking block 1111 to enter the junction of the horizontal perforation 1212 and the vertical perforation 1213, and the valve core assembly 11 is pulled outward, so that the locking block 1111 is locked in the vertical perforation 1213. After the two valve core assemblies 11 and the five-way connector 12 are installed, the faucet housing 2 is installed outside the faucet body 1. The faucet base 3 is installed to the bottom of the faucet housing 2. Since the distance between the positions where the two first water inlet pipes 15 pass through the faucet base 3 does not change, the first water inlet pipes 15 need to be aligned with and connected to the water inlet connectors 111 of the two valve core assemblies 11 in a sealing manner. Therefore, the distance between the water inlet connectors 111 of the two valve core assemblies 11 remains unchanged, so that the locking block 1111 after installation will not be disengaged from the vertical perforation 1213 to the horizontal perforation 1212. The installation of the faucet of the present invention is firm, easy and fast.

Figure 9:
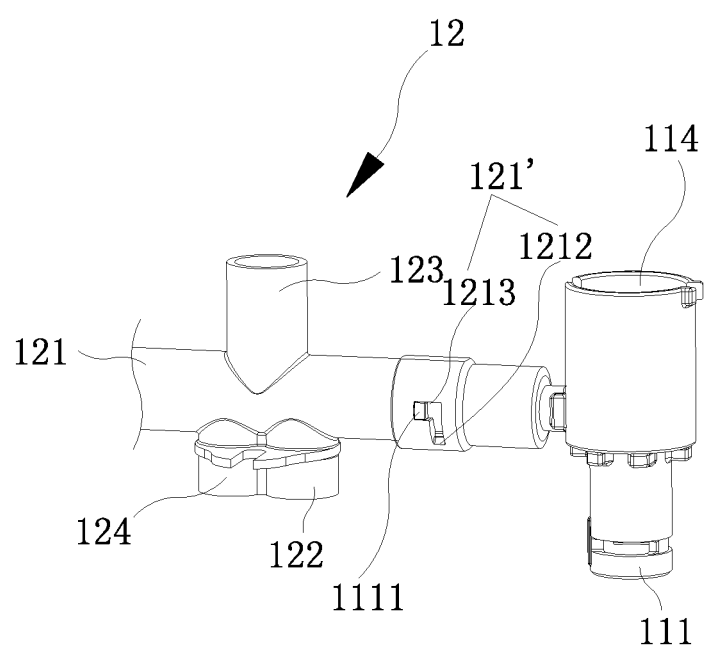
FIG. 9 is a partial schematic view of a second embodiment of the present invention.

FIG. 9 illustrates a second embodiment of the present invention. The difference between the second embodiment and the first embodiment is described below. In the second embodiment, the locking block 1111 is arranged on the outer side wall of each water inlet channel 121 of the five-way connector 12. The slide groove 1211 is arranged on the inner wall surface of the water outlet connector 112. The horizontal perforation 1212 and the vertical perforation 1213 are arranged on the wall of the water outlet connector 112.

Furthermore, the two-handle inductive faucet of the present invention provides different modes to control the flow of water, such as a manual mode and an inductive mode through the sensor 214 to sense different distances of users.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A two-handle inductive faucet, comprising a faucet body, a faucet housing, a faucet base and a control box, the faucet base being detachably mounted to a bottom of the faucet housing, the faucet body being installed in the faucet housing;

the faucet body including two valve core assemblies, a first water outlet pipe and two first water inlet pipes, each valve core assembly having a water inlet connector and a water outlet connector, the water inlet connectors of the two valve core assemblies being hermetically connected to the first water inlet pipes respectively, the faucet body having two water inlet channels and an upper water outlet channel, the water outlet connectors of the two valve core assemblies being hermetically connected to the water inlet channels respectively, the upper water outlet channel being hermetically connected to the first water outlet pipe;

the faucet housing being provided with a protruding sensor unit, the sensor unit being in signal communication with the control box, wherein when the control box receives an opening signal of the sensor unit, the control box controls water from the two water inlet channels to be mixed and then flow out through the first water outlet pipe;

the faucet body further includes a five-way connector, a second water outlet pipe and a second water inlet pipe, the two water inlet channels and the water outer channel are defined in the five-way connector, the five-way connector further has an entry channel and a lower water outlet channel, the entry channel communicates with the two water inlet channels, the lower water outlet channel communicates with the upper water outlet channel, the entry channel is hermetically connected to the second water inlet pipe, the lower water outlet channel is hermetically connected to the second water outlet pipe, the second water inlet pipe and the second water outlet pipe are hermetically connected to the control box, when the control box receives the opening signal of the sensor unit, the control box controls the second water inlet pipe to communicate with the second water outlet pipe.

2. The two-handle inductive faucet as claimed in claim 1, wherein the control box includes a solenoid valve therein, and the solenoid valve controls the second water inlet pipe to communicate with the second water outlet pipe.

3. The two-handle inductive faucet as claimed in claim 1, wherein each valve core assembly includes a valve core, a valve core seat and a valve core locking nut, the valve core is accommodated in the valve core seat, the valve core has an adjustment shaft for adjusting the amount of water, the adjustment shaft of the valve core extends out of the valve core locking nut, the valve core locking nut is configured to lock the valve core in the valve core seat, the valve core is hermetically connected to the valve core seat, and the water inlet connector and the water outlet connector are arranged on the valve core seat.

4. The two-handle inductive faucet as claimed in claim 3, wherein the faucet housing has two handles, the adjustment shafts of the valve cores of the two valve core assemblies are connected to the handles, respectively.

5. The two-handle inductive faucet as claimed in claim 1, wherein the sensor unit is arranged on the faucet housing directly below the first water outlet pipe.

6. The two-handle inductive faucet as claimed in claim 1, wherein the water outlet connector and a corresponding one of the water inlet channels of the five-way connector are connected through a locking block to be mated with a locking portion, and the locking block is detachably, rotatably locked in the locking portion.

7. The two-handle inductive faucet as claimed in claim 6, wherein the locking portion includes a horizontal perforation and a vertical perforation communicating with the horizontal perforation.

8. The two-handle inductive faucet as claimed in claim 7, wherein the locking block is arranged on an outer side wall of the water outlet connector, an inner wall surface of each water inlet channel of the five-way connector is recessed with a slide groove, a wall of each water inlet channel of the five-way connector is formed with the horizontal perforation and the vertical perforation, and the locking block is slid into the horizontal perforation from the slide groove and locked in the vertical perforation.

9. The two-handle inductive faucet as claimed in claim 7, wherein the locking block is arranged on an outer side wall of each water inlet channel of the five-way connector, an inner wall surface of the water outlet connector is recessed with a slide groove, a wall of the water outlet connector is formed with the horizontal perforation and the vertical perforation, and the locking block is slid into the horizontal perforation from the slide groove and locked in the vertical perforation.

10. The two-handle inductive faucet as claimed in claim 1, wherein the sensor unit includes a window and a casing, the window is disposed on the casing, the window protrudes out of the faucet housing, a circuit control board and a sensor are provided in the casing, the sensor is located corresponding to the window, the sensor is electrically connected to the circuit control board, and the circuit control board is electrically connected to the control box.

11. The two-handle inductive faucet as claimed in claim 10, wherein a retaining buckle is fixedly to on a back of the casing, the retaining buckle has two pawls, the pawls are configured to clamp two sides of the first water outlet pipe, and distal ends of the pawls are pressed against an inner wall of the faucet housing.

12. The two-handle inductive faucet as claimed in claim 11, wherein the inner wall of the faucet housing is provided with a counterbore, and the distal ends of the pawls are pressed against a step of the counterbore.

13. The two-handle inductive faucet as claimed in claim 11, wherein the retaining buckle includes a retaining surface and two spaced support members, the pawls are disposed on the retaining surface, the retaining surface is located above the upper water outlet channel of the five-way connector, and the casing is pressed against the inner wall of the faucet housing by the support members.

14. The two-handle inductive faucet as claimed in claim 13, wherein the first water outlet pipe includes a pipe casing and an inner pipe, the inner pipe is accommodated in the pipe casing, the faucet housing has a spout connector, a sleeve is sleeved onto the spout connector, the pipe casing is rotatably, hermetically connected to the sleeve, an inner end of the inner pipe is provided with a connector member, the inner end of the inner pipe is accommodated in the faucet housing, a side wall of the connector member is formed with an engaging groove, the pawls of the retaining buckle are engaged in the engaging groove, the connector member is rotatably, hermetically connected to the upper water outlet channel of the five-way connector, a limiting rib is provided in the upper water outlet channel of the five-way connector, and the inner pipe is arranged above the limiting rib.

15. The two-handle inductive faucet as claimed in claim 1, wherein a bottom of the faucet base is integrally formed with two threaded pipes, the first water inlet pipes are inserted through the threaded pipes respectively, and the second water outlet pipe and the second water inlet pipe are inserted through the faucet base and fixed to the five-way connector.

16. The two-handle inductive faucet as claimed in claim 15, wherein a top of the faucet base is integrally formed with two split threaded connectors, the threaded connectors communicate with the corresponding threaded pipes respectively, the first water inlet pipes are inserted into the corresponding threaded connectors respectively, and the water inlet connectors of the two valve core assemblies are accommodated in the corresponding threaded connectors, respectively.

17. The two-handle inductive faucet as claimed in claim 1, wherein the sensor unit is provided with an upper connecting wire having a wire connector, the control box is provided with a lower connecting wire having another wire connector, and the wire connector of the upper connecting wire is electrically connected to the wire connector of the lower connecting wire.

* * * * *